(12) United States Patent
Toniolo et al.

(10) Patent No.: US 10,888,976 B2
(45) Date of Patent: Jan. 12, 2021

(54) SUCTION CUP UNIT FOR GRIPPING WORKPIECES

(71) Applicants: BIESSE S.p.A., Chiusa di Ginestreto (IT); TECNO LOGICA S.r.l., Spresiano (IT)

(72) Inventors: Carlo Toniolo, Spresiano (IT); Matteo Traini, Chiusa di Ginestreto (IT)

(73) Assignees: Biesse S.p.A., Chiusa di Ginestreto (IT); Tecno Logica S.r.l., Spresiano (IT)

( * ) Notice: Subject to any disclaimer, the term of this patent is extended or adjusted under 35 U.S.C. 154(b) by 255 days.

(21) Appl. No.: 16/230,254

(22) Filed: Dec. 21, 2018

(65) Prior Publication Data
US 2019/0193250 A1    Jun. 27, 2019

(30) Foreign Application Priority Data

Dec. 22, 2017    (IT) .......................... 102017000149044

(51) Int. Cl.
*B25B 11/00*    (2006.01)
*B23Q 3/08*    (2006.01)
*B23Q 7/04*    (2006.01)

(52) U.S. Cl.
CPC ............ *B25B 11/005* (2013.01); *B23Q 3/088* (2013.01); *B23Q 7/04* (2013.01); *B23Q 2240/002* (2013.01)

(58) Field of Classification Search
CPC ....... B25B 11/00; B25B 11/005; B25B 11/02; B23P 11/00; B23P 11/022; B23Q 3/00; B23Q 3/068; B23Q 3/067; B23Q 3/088
See application file for complete search history.

(56) References Cited

U.S. PATENT DOCUMENTS

| 4,865,521 | A | | 9/1989 | Ise et al. |
| 5,617,338 | A | * | 4/1997 | Sugano ................ B65G 47/917 340/626 |
| 2002/0144739 | A1 | | 10/2002 | Schnatterer et al. |
| 2008/0265595 | A1 | | 10/2008 | Perlman |
| 2010/0045057 | A1 | | 2/2010 | Tell |

(Continued)

FOREIGN PATENT DOCUMENTS

| EP | 2682227 B1 | 8/2014 |
| EP | 2655007 B1 | 6/2016 |

OTHER PUBLICATIONS

Italian Search Report for corresponding Italian Application No. 201700149044 completed on Aug. 29, 2018.

*Primary Examiner* — Lee D Wilson
(74) *Attorney, Agent, or Firm* — Heslin Rothenberg Farley & Mesiti P.C.; Victor A. Cardona, Esq.

(57) ABSTRACT

A suction cup unit for gripping workpieces comprises a suction cup member carried by a support body within which a device is arranged for autonomously generating a vacuum to be applied to the suction cup member. The vacuum generator device includes an ejector-effect device, configured to generate a vacuum by supplying a flow of pressurized air through a nozzle, a reservoir of pressurized air connected to the nozzle, at least one electrically-operated valve for controlling the connection between the pressurized air reservoir and the nozzle, and a connecting line between the nozzle and the suction cup member, for transmitting a vacuum to the suction cup member when pressurized air is made to flow through the nozzle.

10 Claims, 2 Drawing Sheets

(56) References Cited

U.S. PATENT DOCUMENTS

Figure 1:
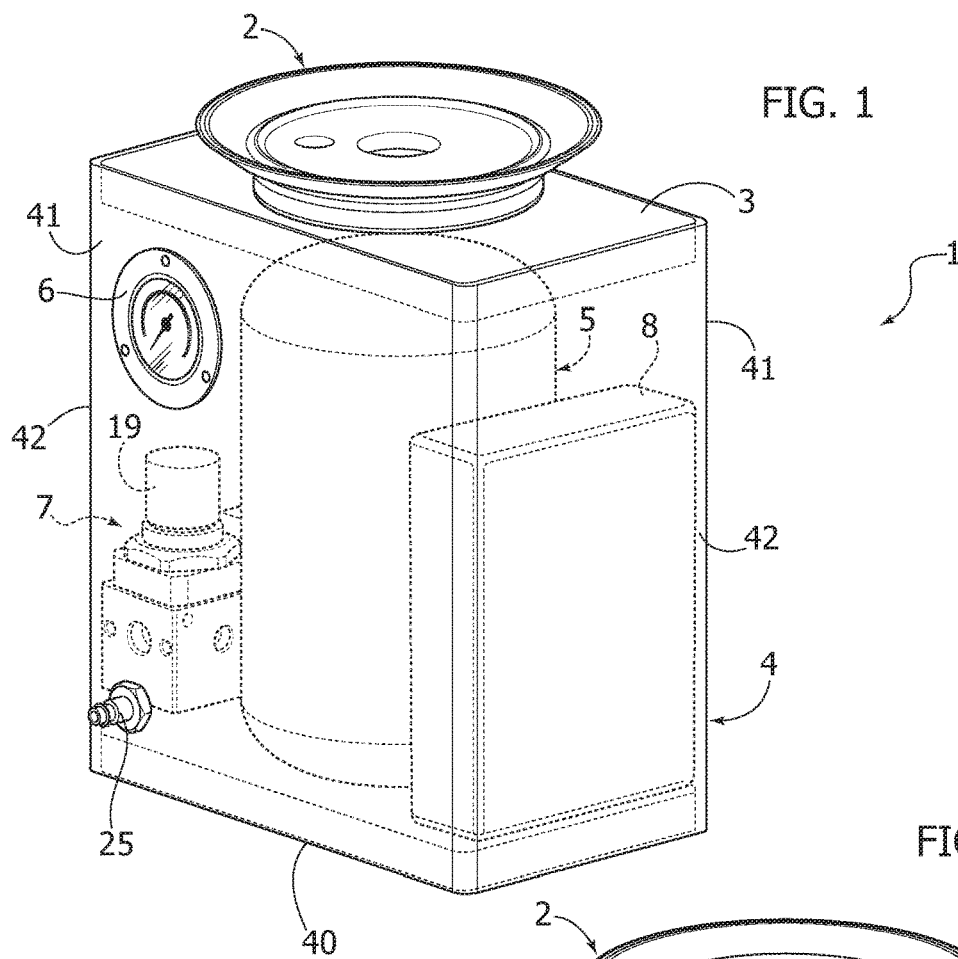

2013/0270757 A1* 10/2013 Thibaut .................... B23Q 1/03
269/21
2019/0193250 A1* 6/2019 Toniolo .................. B23Q 3/088

* cited by examiner

SUCTION CUP UNIT FOR GRIPPING WORKPIECES

CROSS REFERENCE TO RELATED APPLICATIONS

This application claims priority from Italian Patent Application No. 102017000149044 filed on Dec. 22, 2017, the entire disclosure of which is incorporated herein by reference.

FIELD OF THE INVENTION

The present invention relates to suction cup units for gripping workpieces The invention generally relates to suction cup gripping units for applications of any type, but is particularly advantageous, for example, in the field of machines for processing slabs of various materials (for example, plates of glass, stone, synthetic material or wood), where it can be used to lock the plate to be processed on the machine work surface. In an alternative application, the suction cup unit according to the invention can be used, for example, on a robot manipulator to allow the gripping of pieces by the robot.

PRIOR ART

In numerical control work centers or in machines of various types intended for processing slabs, for example, glass plates, stone slabs (natural or synthetic), or wooden boards, the plate to be machined is locked above the work surface of the machine, in a horizontal position, at a certain distance from the plane of the machine, by means of a plurality of suction cup units. Typically, each suction cup unit is provided with two suction cup members arranged on its upper face and on its lower face, respectively. The lower suction cup member is used to lock the suction cup unit on the work surface of the machine, while the upper suction cup member is used to lock the plate above the suction cup unit. The various suction cup units are, each time, positioned on the machine plane in positions freely chosen by the user, according to the shape and dimensions of the plate to be processed and the area of the work surface on which the plate must be positioned.

In more conventional machines, the various suction cup units are connected by means of flexible tubes to a manifold arranged on one side of the machine and—in turn—communicating with a vacuum source, typically a suction pump. The flexible tubes give the user the possibility of positioning the suction cup units in any area of the work surface of the machine, but still represent an encumbrance that it would be preferable not to have.

In order to overcome this drawback, suction cup units have already been proposed (see, for example, EP 2 682 227 B1 and EP 2 655 007 B1) of the type comprising a suction cup member carried by a support body, in which the support body also carries a device for independently generating a vacuum to be applied to the suction cup member. In these known solutions, the aforesaid vacuum generator device is a suction pump, arranged inside the suction cup unit. This solution is relatively complicated and expensive and also entails a relatively large size and weight, which make the suction cup unit impractical.

OBJECT OF THE INVENTION

The object of the present invention is to provide a suction cup unit of the type including a device for autonomously generating a vacuum, which is simpler and cheaper than the known solutions mentioned above.

Another object of the present invention is to provide a suction cup unit of the type specified above, which is lighter and less cumbersome than the known solutions mentioned above.

Yet another object of the invention is to provide a suction cup unit of the type specified above which is simple to use and which is particularly suitable for remote control by the operator.

SUMMARY OF THE INVENTION

In view of achieving one or more of the aforesaid objects, the invention relates to a suction cup unit comprising a suction cup member carried by a support body, in which the support body also carries a device capable of autonomously generating a vacuum to apply to the suction cup member, said suction cup unit being characterized in that the aforesaid vacuum generator device includes:

- an ejector-effect device, comprising a nozzle configured to generate a vacuum at a nozzle auxiliary outlet when a flow of pressurized air is fed through said nozzle,
- a reservoir of pressurized air connected to said nozzle,
- at least one electrically-operated valve interposed in the connection between the reservoir of pressurized air and the nozzle, for controlling communication between the reservoir and the nozzle, and
- a line connecting said nozzle to said suction cup member, to transmit a vacuum to said suction cup member when pressurized air is fed from said reservoir through said nozzle.

The ejector-effect devices, configured to generate a vacuum by feeding a flow of pressurized air through a nozzle, have been known and used for some time. The invention consists in having understood that inside a suction cup unit it is possible to provide an independent vacuum source without resorting to a suction pump, but simply by using an ejector-like device of the type indicated above, and associating it with a pressurized air reservoir, configured to be connected to the nozzle of the ejector-effect device.

In the preferred embodiment of the invention, a pressure reducing valve is interposed in the connection between the pressurized air reservoir and the nozzle of the ejector-effect device. Thanks to this characteristic, it is possible to envisage that the reservoir is charged with air at a relatively high pressure (for example, in the order of 15-20 bars or even higher) while the aforesaid pressure reducing valve reduces the pressure of the flow of air towards the nozzle, when this flow is activated, to values, for example, in the order of 4-5 bars, sufficient to generate the required vacuum in order to activate the suction cup member. As a consequence, the time for emptying the pressurized air reservoir is relatively high and, consequently, the autonomy of the suction cup unit is high.

In the preferred embodiment, the suction cup unit comprises a second line for feeding pressurized air from said reservoir to said suction cup member, to facilitate detachment of the suction cup member from a previously gripped workpiece, and at least one additional electrically-operated valve interposed in said second line for enabling pressurized air to be fed from said reservoir to said suction cup member.

Furthermore, the suction cup unit is preferably provided with an electronic control unit, configured to control the aforesaid electrically-operated valves. The electronic control unit is associated with an electric power supply battery and a wireless communication unit that allows control of the suction cup unit from a remote position.

Thanks to all the aforesaid characteristics, the suction cup unit according to the invention can be used advantageously in all the applications where it is useful to have an independent suction cup unit, capable of generating the vacuum necessary for its activation, without the need for connection to an external vacuum source and without, however, involving the complication, the bulk and the weight of a suction pump arranged therein.

A particularly advantageous application of the invention involves suction cup units that can be used to lock a plate to be machined on the work surface of a numerical control machine or work center. In this case, the suction cup unit is arranged with two suction cup members, respectively, on its upper face and on its lower face, and the unit is configured to communicate a vacuum to the lower suction cup member only, or to the upper suction cup member only, or to both suction cup members.

Figure 2:
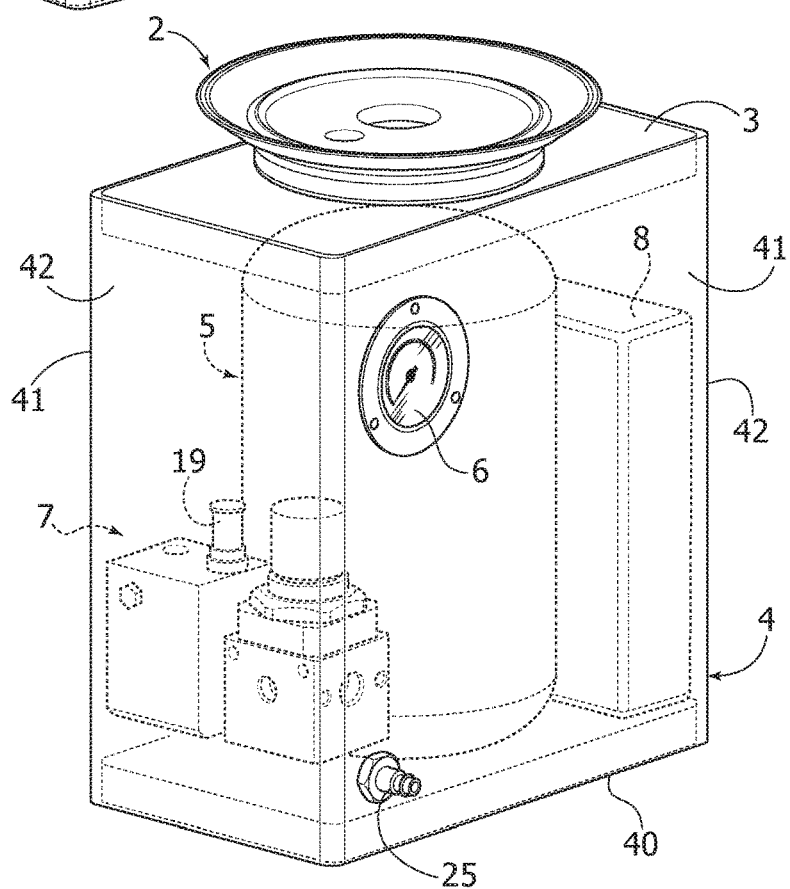
Figure 3:
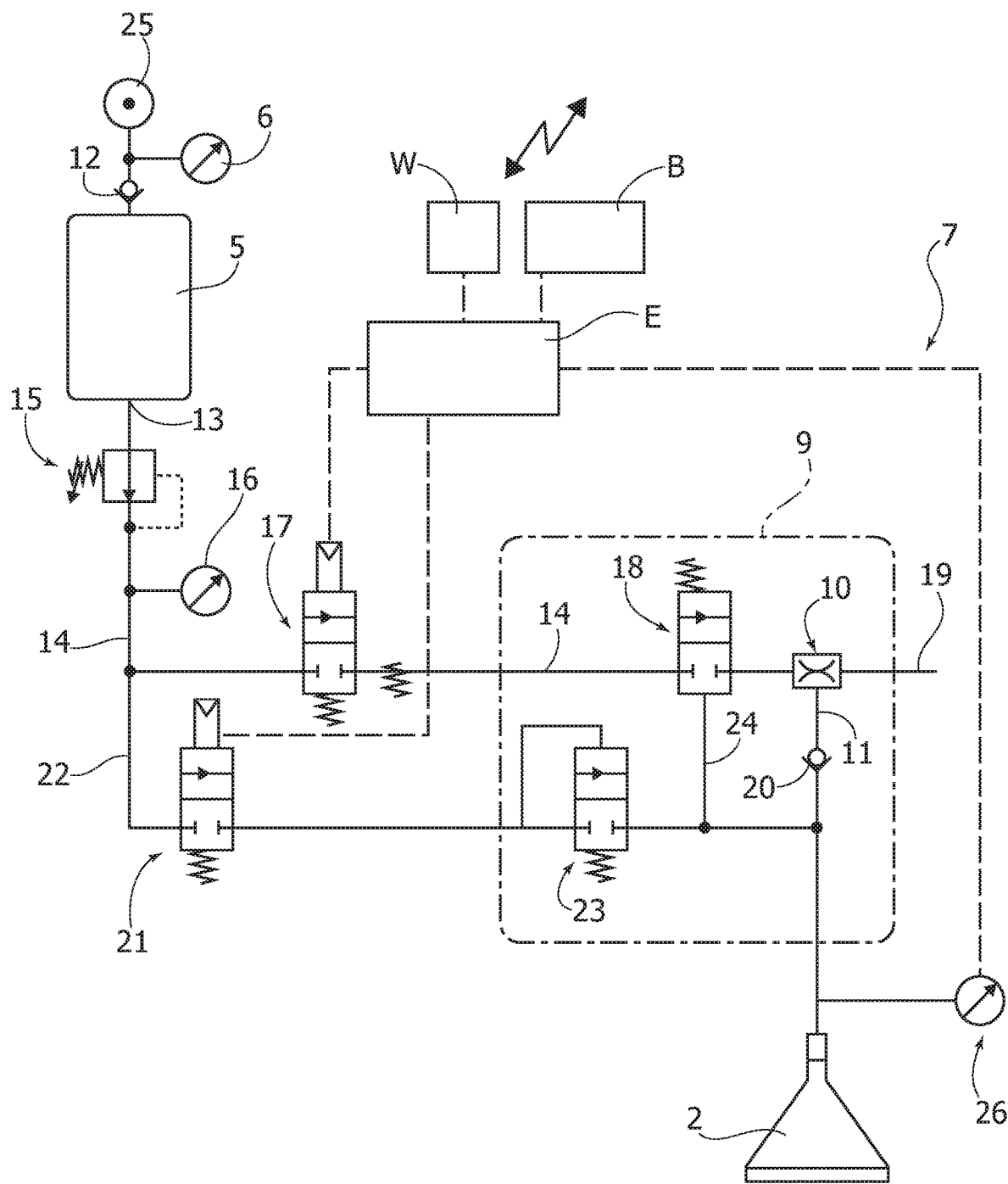

Further characteristics and advantages of the invention will become apparent from the description that follows with reference to the attached drawings, provided purely by way of non-limiting example, wherein:

FIG. 1 is a perspective view of a first embodiment of the suction cup unit according to the invention, FIG. 2 is an additional perspective view of the suction cup unit of FIG. 1, and FIG. 3 is a diagram of the pneumatic circuit of the suction cup unit of FIGS. 1, 2.

In FIGS. 1 and 2, numeral 1 indicates—in its entirety—a suction cup unit, comprising a suction cup member 2 arranged on the upper face 3 of a support body 4. The support body 4, in the illustrated example, consists of a casing, for example, of metal material, comprising a base wall 40, two opposite main walls 41, two opposite side walls 42 and an upper wall defining the upper face 3.

The details relating to the structure and conformation of the suction cup member 2 are not described or illustrated herein, as they can be of any known type and do not fall within the scope of the present invention. Typically, the suction cup member 2 has a body of elastomeric material with a peripheral sealing lip configured to come into contact with the surface of the workpiece, so as to create an insulated chamber between the suction cup and this surface.

Inside the container forming the support body 4, a reservoir 5 of metal material is provided, within which pressurized air is charged, for example, at a pressure of 15 to 20 bars. In the attached drawings, the reservoir 5, which has a cylindrical shape, has its axis arranged vertically. It is, however, evident that there can be any configuration or arrangement of the reservoir 5. For example, the reservoir 5 can also be arranged with its axis horizontally, consequently adapting the dimensions of the container 4.

A pressure sensor 6 is associated with the reservoir 5 (see also FIG. 3), whose quadrant is enclosed in one of the main walls 41, to allow the air pressure level inside the reservoir 5 to be monitored.

In FIGS. 1 and 2, the reference number 7 indicates—in its entirety—the components of the pneumatic circuit of the suction cup unit (described hereinafter), while the reference number 8 indicates a container for the electronic control unit E (FIG. 3) of the suction cup unit.

With reference now to the diagram of FIG. 3, the pneumatic circuit 7 includes an ejector-effect device 9 for generating a vacuum. As already specified above, devices for generating a vacuum by means of an ejector-effect have been known and used for a long time. In a concrete embodiment of the invention, the Applicant has used a generator device produced and marketed by the company PIAB and identified by the code number 0200984. The device 9 includes a nozzle 10 which can be connected to the pressurized air reservoir 5 so as to receive a flow of pressurized air therethrough, to consequently generate a vacuum that is communicated to a duct 11 that connects an auxiliary outlet of the nozzle 10 to the suction cup member 2.

Again, with reference to FIG. 3, the inlet of the reservoir 5 is connected via a non-return valve 12 to the pressure sensor 6. The non-return valve 12 allows air to flow only in the direction from the reservoir 5 to the sensor 6.

The reservoir 5 has an outlet 13 which is connected via a duct 14 to the nozzle 10 of the device 9 for generating a vacuum. Immediately downstream of the outlet 13, a pressure reducing valve 15, of any known type, is interposed in the duct 14, which is configured to reduce the pressure in the flow of air that flows through the duct 14, when said flow is activated. For example, the valve 15 is able to convert the air pressure from a value of around 20-25 bars inside the reservoir 5 to a value of 4-5 bars, sufficient to generate the vacuum necessary to activate the suction cup member 2.

An additional pressure sensor 16 is arranged downstream of the pressure reducing valve 15, which detects the pressure downstream of the pressure reducing valve 15. The pressure sensor 16, as well as the pressure sensor 6, as well as a vacuum switch 26 that is connected to the suction cup member 2, are configured to emit electrical signals indicative of the detected pressure and to send them to an electronic control and processing unit E.

A solenoid valve 17 (normally closed) is interposed in the duct 14, between the pressure reducing valve 15 and the nozzle 10 of the device 9. The solenoid of the solenoid valve 17 is controlled by the electronic control unit E, for controlling the opening of the solenoid valve 17 when the suction cup member 2 should be activated. When the solenoid valve 17 opens, a flow of air from the reservoir 5 is initiated, which flows through the pressure reducing valve 15, and then through a (normally open) valve 18 to the nozzle 10. The flow of air that flows through the nozzle 10 is discharged to the outside through an outlet 19 (see also FIG. 2). The flow of air that flows through the nozzle 10 causes a vacuum that is communicated to the duct 11 and, through this, to the suction cup member 2. The drawn air coming from the suction cup member 2 is discharged at the outlet 19, together with the main flow of the air coming from the reservoir 5. In this way, the device 9 is able to generate the vacuum necessary to activate the suction cup member 2. A non-return valve 20 is interposed in the duct 11, to allow an air flow only in the direction going from the suction cup member 2 towards the nozzle 10, so as to maintain the vacuum established in the suction cup member 2, in the hypothesis that the chamber defined between the suction cup member 2 and the surface of the gripped piece is insulated from the outside.

The circuit 7 also comprises a duct 22 which branches from the duct 14 and flows into the duct 11. A (normally closed) solenoid valve 21 is interposed in the duct 22, whose solenoid is controlled by the electronic control unit E to enable, when required, a flow of air from the pressurized air reservoir 5 directly to the duct 11 and to the suction cup member 2. In this condition, the non-return valve 20 prevents a flow of air towards the nozzle 10.

In the duct 22, downstream of the solenoid valve 21, a (normally closed) valve 23 is provided, which opens automatically due to an inflow of pressurized air. Downstream of the valve 23, the duct 22 communicates with the valve 18 by means of a line 24 which carries a pilot pressure signal configured to cause closure of the valve 18. When the solenoid valve 21 is instructed to open, closure of the solenoid valve 17 is instructed at the same time. In the aforesaid operating condition, the pressurized air fed directly to the suction cup member 2 generates a blast that facilitates detachment of a workpiece previously gripped by the suction cup member 2, after the latter has been deactivated.

The electronic control unit E is associated with an electric power supply battery B and a wireless communication unit W that allows control of the suction cup unit from a remote position.

The electronic control unit is configured to receive the pressure signal from pressure sensors associated with the connecting lines between the pressurized air reservoir, the nozzle and the suction cup member and to control said electrically-operated valves on the basis of said signals and/or based on a predetermined program and/or based on the operator's command.

As is evident from the above description, the suction cup unit according to the invention is completely independent, being provided therein with means suitable to generate the vacuum necessary for activating the suction cup member. At the same time, the suction cup unit according to the invention has a relatively simple and economical structure, and has a relatively reduced weight and size.

All the aforesaid characteristics make the use of the suction cup unit according to the invention particularly advantageous in various applications, for example, on robot manipulators, to allow the robot to grip a workpiece, or on machines or machining centers for processing plates, such as glass plates or stone (natural or synthetic) slabs, or plates of plastic or wood.

In the case of this application, the suction cup unit can be arranged with two suction cup members carried by two opposite faces of said support body, and configured to transmit a vacuum to either one of said suction cup members or both suction cup members.

Alternatively, the suction cup unit may comprise a suction cup member carried by an upper face of the unit and a mechanical connecting device arranged on a lower face of the unit, for the removable mechanical connection of said unit on a work surface of a machine for processing workpieces intended to be supported and retained above said suction cup member.

As already indicated a preferred application of the suction cup according to the invention is a machine for processing workpieces in plate-form, in particular plates of glass, stone, synthetic material or wood, comprising a work surface and one or more suction cup units for supporting and retaining a workpiece on the work surface, produced according to the invention.

Another application is that of a tool for gripping pieces, arranged for connection to a robot arm, and comprising at least one suction cup unit according to the invention.

Of course, without prejudice to the principle of the invention, the details of construction and the embodiments may vary widely with respect to those described and illustrated purely by way of example, without departing from the scope of the present invention.

What is claimed is:

1. A suction cup unit for gripping workpieces, wherein said suction cup unit comprises a suction cup member carried by a support body, and wherein the support body of the suction cup member also carries a vacuum generating device configured to autonomously generate a vacuum to be applied to the suction cup member,
said suction cup unit being characterized in that said vacuum generating device includes:
   an ejector-effect device, comprising a nozzle configured to generate a vacuum at a nozzle auxiliary outlet when a flow of pressurized air is fed through said nozzle,
   a reservoir of pressurized air connected to said nozzle,
   at least one electrically-operated valve interposed in the connection between the reservoir of pressurized air and the nozzle, for controlling communication between the reservoir and the nozzle, and
   a line for connecting said nozzle to said suction cup member, in order to transmit a vacuum to said suction cup member when pressurized air is fed from said reservoir through said nozzle.

2. A suction cup unit according to claim 1, wherein a pressure reducing valve is interposed in the connection between said reservoir of pressurized air and said nozzle.

3. A suction cup unit according to claim 1, wherein said suction cup unit further comprises a second line for feeding pressurized air from said reservoir to said suction cup member, to facilitate detachment of the suction cup member from a previously gripped workpiece, and at least one additional electrically-operated valve interposed in said second line for enabling pressurized air to be fed from said reservoir to said suction cup member.

4. A suction cup unit according to claim 3, wherein said suction cup unit comprises an electronic control unit configured to receive pressure signals from pressure sensors associated with lines connecting the reservoir of pressurized air, the nozzle and the suction cup member, and to control said electrically-operated valves on the basis of said signals and/or based on a predetermined program and/or based on an operator's command.

5. A suction cup unit according to claim 4, wherein an electric power supply battery, which is also carried by said support body, is associated with said electronic control unit.

6. A suction cup unit according to claim 4, wherein a wireless communication unit is associated with said electronic control unit, for enabling said suction cup unit to be controlled from a remote position.

7. A suction cup unit according to claim 1, wherein said suction cup unit further comprises two suction cup members carried by two opposite faces of said support body and in that said suction cup unit is configured to transmit a vacuum to one of said suction cup members or to both suction cup members.

8. A suction cup unit according to claim 1, wherein said suction cup unit further comprises a suction cup member carried by an upper face of said unit, and a mechanical connecting device arranged at a lower face of said unit, for removable mechanical connection of said unit to a work surface of a machine for machining workpieces that are to be supported and retained above said work surface by said suction cup member.

9. A machine for processing workpieces in plate-form, in particular plates of glass, stone slabs, or plates of synthetic material or wood, said machine comprising a work surface and atleast one suction cup unit for supporting and retaining a workpiece on the work surface, further comprises said at least one suction cup unit is a suction cup unit according to any one of the preceding claims.

10. A gripping tool for gripping workpieces, configured to be connected to a robot arm, further comprises at least one suction cup unit according to claim 1.

* * * * *